United States Patent
Wu et al.

(10) Patent No.: US 11,366,358 B2
(45) Date of Patent: Jun. 21, 2022

(54) DISPLAY APPARATUS

(71) Applicant: Au Optronics Corporation, Hsinchu (TW)

(72) Inventors: Cian-Rou Wu, Hsinchu (TW); Kun-Cheng Tien, Hsinchu (TW); Chien-Huang Liao, Hsinchu (TW); Chin-An Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 247 days.

(21) Appl. No.: 16/892,302

(22) Filed: Jun. 4, 2020

(65) Prior Publication Data
US 2021/0271125 A1    Sep. 2, 2021

(30) Foreign Application Priority Data
Mar. 2, 2020  (TW) .................. 109106658

(51) Int. Cl.
*G02F 1/13363* (2006.01)
*G02F 1/1343* (2006.01)
*G09G 3/36* (2006.01)

(52) U.S. Cl.
CPC ........ *G02F 1/13363* (2013.01); *G02F 1/1343* (2013.01); *G09G 3/3648* (2013.01)

(58) Field of Classification Search
CPC ............. G02F 1/1343; G02F 1/134309; G02F 1/134372; G02F 1/134318; G02F 1/1347; G02F 1/13476; G09G 3/3648; G09G 2300/0426; G09G 2300/0421; G09G 2300/023
See application file for complete search history.

(56) References Cited

U.S. PATENT DOCUMENTS

| | | | |
|---|---|---|---|
| 7,453,529 B2 * | 11/2008 | Nam | H04N 13/31 348/E13.059 |
| 8,319,702 B2 | 11/2012 | Tsai | |
| 10,712,611 B2 | 7/2020 | Li et al. | |
| 2012/0105409 A1 * | 5/2012 | Tsai | G02F 1/134336 359/245 |
| 2019/0294001 A1 | 9/2019 | Li et al. | |

FOREIGN PATENT DOCUMENTS

| | | |
|---|---|---|
| CN | 104020615 | 9/2014 |
| CN | 106873283 | 6/2017 |
| CN | 209746322 | 12/2019 |
| TW | 201217836 | 5/2012 |

* cited by examiner

*Primary Examiner* — Edward J Glick
*Assistant Examiner* — David Y Chung
(74) *Attorney, Agent, or Firm* — JCIPRNET

(57) ABSTRACT

A display apparatus includes a display panel and a switching panel disposed outside the display panel. The switching panel includes a first base, first and second electrodes disposed on the first base, a second base, third and fourth electrodes disposed on the second base, and a liquid crystal layer disposed between the first base and the second base. When the display apparatus is operated in a first anti-peep mode, the first electrode and the second electrode disposed on the first base have a first AC driving signal and a second AC driving signal respectively, and the third electrode and the fourth electrode disposed on the second base have DC reference signals respectively, wherein the first AC driving signal and the second AC driving signal are in synchronization.

13 Claims, 15 Drawing Sheets

DISPLAY APPARATUS

CROSS-REFERENCE TO RELATED APPLICATION

This application claims the priority benefit of Taiwan application serial no. 109106658, filed on Mar. 2, 2020. The entirety of the above-mentioned patent application is hereby incorporated by reference herein and made a part of this specification.

BACKGROUND

Field of the Disclosure

The disclosure relates to an optoelectronic apparatus, and in particular to a display apparatus.

Description of Related Art

Nowadays, display apparatuses have been commonly employed in various electronic products such as: television, desktop PC, smart phone, notebook computer, tablet PC and so on due to their advantages of being light, thin, short, energy-saving, etc. With the development of display technology and the rising concerns about privacy, the privacy protecting technology of display apparatuses has received more attention, and therefore the R&D personnel have made a lot of efforts in developing the privacy protecting technology. Generally speaking, once the fabrication of display apparatus is completed, the anti-peep direction of the display apparatus has also been determined. However, in different occasions and/or with different use methods, users need different anti-peeping directions to protect their privacy.

SUMMARY OF THE DISCLOSURE

The disclosure provides a display apparatus of which the anti-peep direction can be changed.

The display apparatus of the disclosure includes a display panel and a switching panel provided outside the display panel. The switching panel includes a first base, a first electrode disposed on the first base, a first insulating layer disposed on the first electrode, a second electrode disposed on the first insulating layer, a second base disposed opposite to the first base, a third electrode disposed on the second base, a second insulating layer disposed on the third electrode, a fourth electrode disposed on the second insulating layer, and a liquid crystal layer disposed between the first base and the second base, wherein the second electrode has a plurality of branch portions, the plurality of branch portions of the second electrode are arranged in the first direction, the fourth electrode has a plurality of branch portions, and the plurality of branch portions of the fourth electrode are arranged in the second direction, and the first direction and the second direction are alternated with each other. When the display apparatus is in the first anti-peep mode, the first electrode and the second electrode provided on the first base respectively have a first AC driving signal and a second AC driving signal that are in synchronization, and the third electrode and the fourth electrode provided on the second base respectively have a plurality of DC reference signals.

In an embodiment of the disclosure, when the display apparatus is in the first anti-peep mode, there is a difference $\Delta B$ between the amplitude of the first AC driving signal and the amplitude of the second AC driving signal.

In an embodiment of the disclosure, when the display apparatus is in the first anti-peep mode, the amplitude of the first AC driving signal and the amplitude of the second AC driving signal are substantially equal to each other.

In an embodiment of the disclosure, when the display apparatus is in the first anti-peep mode, there is a potential difference $\Delta A$ between the plurality of DC reference signals of the third electrode and the fourth electrode.

In an embodiment of the disclosure, $|\Delta A|$ is greater than 0 volts and less than or equal to 1.5 volts.

In an embodiment of the disclosure, when the display apparatus is in the second anti-peep mode, the third electrode and the fourth electrode provided on the second base respectively have a third AC driving signal and a fourth AC driving signal that are in synchronization, and the first electrode and the second electrode disposed on the first base respectively have a plurality of DC reference signals.

In an embodiment of the disclosure, when the display apparatus is in the second anti-peep mode, there is a difference $\Delta D$ between the amplitude of the third AC driving signal and the amplitude of the fourth AC driving signal.

In an embodiment of the disclosure, when the display apparatus is in the second anti-peep mode, the amplitude of the third AC driving signal and the amplitude of the fourth AC driving signal are substantially equal to each other.

In an embodiment of the disclosure, when the display apparatus is in the second anti-peep mode, there is a potential difference $\Delta C$ between the plurality of DC reference signals of the first electrode and the second electrode.

In an embodiment of the disclosure, $|\Delta C|$ is greater than 0 volts and less than or equal to 1.5 volts.

In an embodiment of the disclosure, when the display apparatus is in the sharing mode, the first electrode, the second electrode, the third electrode and the fourth electrode are not enabled, and the longitudinal axes of the plurality of liquid crystal molecules of the liquid crystal layer are substantially perpendicular to the first base.

In an embodiment of the disclosure, an angle $\theta$ is formed between one of the plurality of branch portions of the second electrode and one of the plurality of branch portions of the fourth electrode, and $80° \leq \theta \leq 100°$.

In an embodiment of the disclosure, the plurality of liquid crystal molecules of the liquid crystal layer are a plurality of negative liquid crystal molecules.

DESCRIPTION OF EMBODIMENTS

Figure 1:
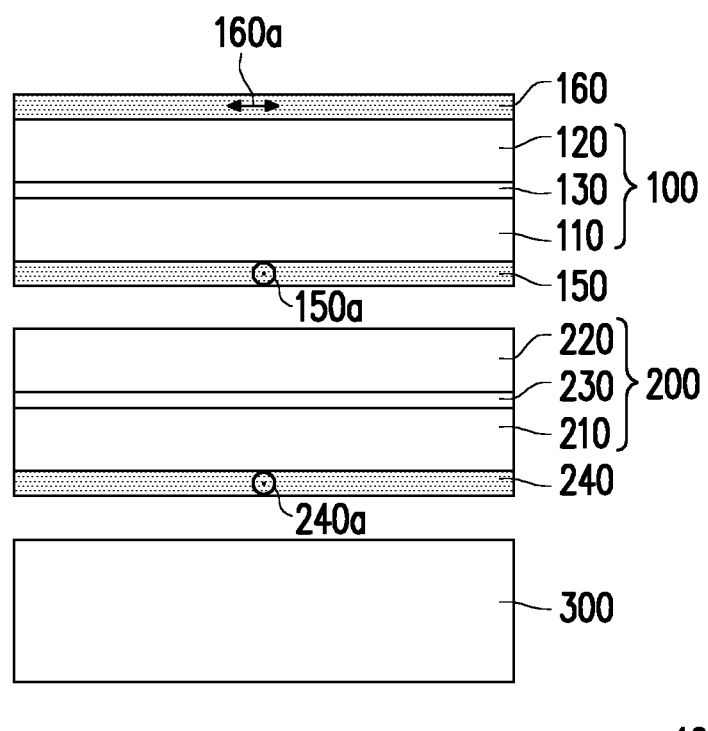
FIG. 1 is a schematic cross-sectional view of a display apparatus 10 according to an embodiment of the disclosure.

Hereinafter, exemplary embodiments of the disclosure are described in detail, and examples of the exemplary embodiments are conveyed via the figures. Wherever possible, the same reference numerals are used in the figures and the descriptions to refer to the same or similar portions.

It should be understood that, when a layer, film, region, or an element of a substrate is "on" another element or "connected to" another element, the element may be directly on the other element or connected to the other element, or an intermediate element may also be present. On the other hand, when an element is "directly on another element" or "directly connected to" another element, an intermediate element is not present. As used in the present specification, "connected to" may refer to a physical and/or electrical connection. Furthermore, "electrically connected" or "coupled" may mean that other elements are present between two elements.

"About", "similar", or "substantially" used in the present specification include the value and the average value within an acceptable deviation range of a specific value confirmed by those having ordinary skill in the art, and the concerned measurement and a specific quantity (i.e., limitations of the measuring system) of measurement-related errors are taken into consideration. For instance, "about" may represent within one or a plurality of standard deviations of the value, or within ±30%, ±20%, ±10%, or ±5%. Moreover, "about", "similar", or "substantially" used in the present specification may include a more acceptable deviation range or standard deviation according to optical properties, etching properties, or other properties, and one standard deviation does not need to apply to all of the properties.

Unless otherwise stated, all of the terminology used in the present specification (including technical and scientific terminology) have the same definition as those commonly understood by those skilled in the art of the disclosure. It should be further understood that, terminology defined in commonly-used dictionaries should be interpreted to have the same definitions in related art and in the entire specification of the disclosure, and are not interpreted as ideal or overly-formal definitions unless clearly stated as such in the present specification.

FIG. 1 is a schematic cross-sectional view of a display apparatus 10 according to an embodiment of the disclosure.

Referring to FIG. 1, the display apparatus 10 includes a display panel 100. The display panel 100 includes a pixel array substrate 110, an opposite substrate 120, and a display medium 130 disposed between the pixel array substrate 110 and the opposite substrate 120. In this embodiment, the pixel array substrate 110 includes a plurality of pixel structures (not shown), and each of the pixel structures has an active element (not shown) and a pixel electrode (not shown) electrically connected to the active element, but the disclosure is not limited thereto.

The display apparatus 10 further includes a switching panel 200 provided outside the display panel 100. For example, in this embodiment, the display medium 130 of the display panel 100 may be a non-self-luminous display medium (such as but not limited to: liquid crystal), and the display apparatus 10 may further include a backlight module 300 (such as but not limited to: collimated backlight). The backlight module 300 is disposed under the display panel 100, and the switching panel 200 can be selectively disposed between the backlight module 300 and the display panel 100. However, the disclosure is not limited thereto. In other embodiments, the switching panel 200 can also be disposed at other locations; the display medium 130 is also not limited to non-self-luminous display medium; the more examples will follow with reference to other drawings.

Figure 2:
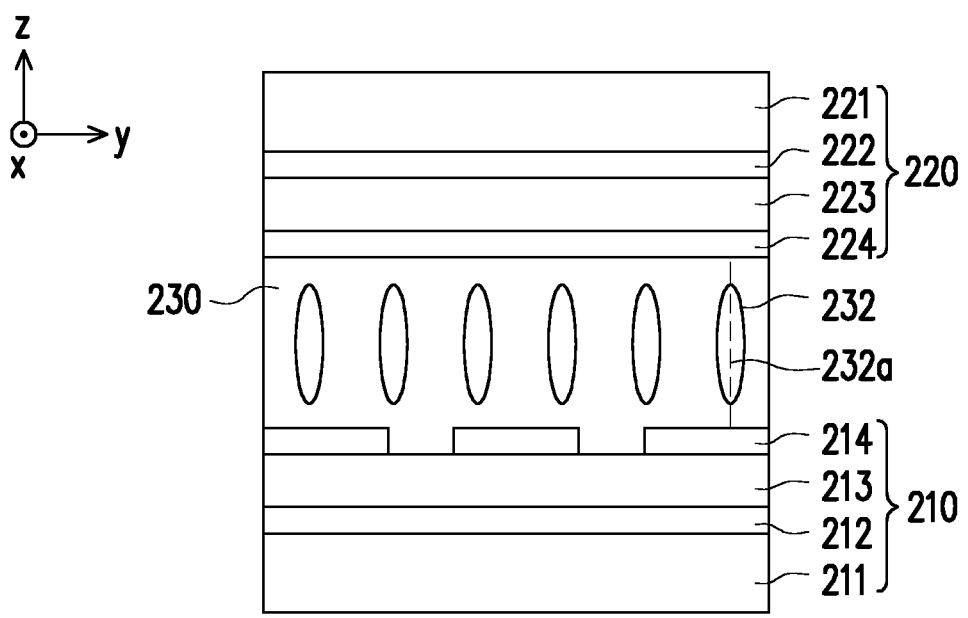
FIG. 2 is a schematic cross-sectional view of a switching panel 200 according to an embodiment of the disclosure.

FIG. 2 is a schematic cross-sectional view of a switching panel 200 according to an embodiment of the disclosure.

Figure 3:
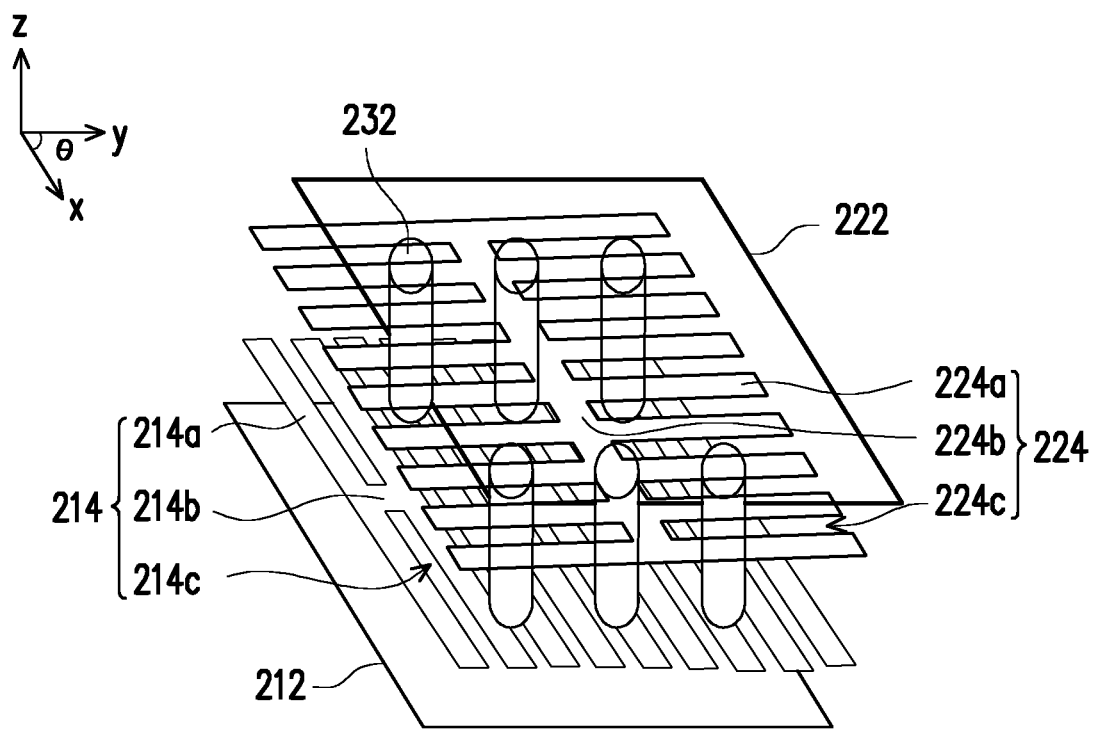
FIG. 3 is a schematic perspective view of the first electrode 212, the second electrode 214, the third electrode 222, the fourth electrode 224, and the plurality of liquid crystal molecules 232 of the switching panel 200 of FIG. 2.

FIG. 3 is a schematic perspective view of the first electrode 212, the second electrode 214, the third electrode 222, the fourth electrode 224, and the plurality of liquid crystal molecules 232 of the switching panel 200 of FIG. 2.

Specifically, FIG. 2 and FIG. 3 show the state of the switching panel 200 when the display apparatus 10 is in the sharing mode.

For clarity, FIG. 2 and FIG. 3 depict a first direction y, a second direction x, and a third direction z that are perpendicular to each other.

Figure 4:
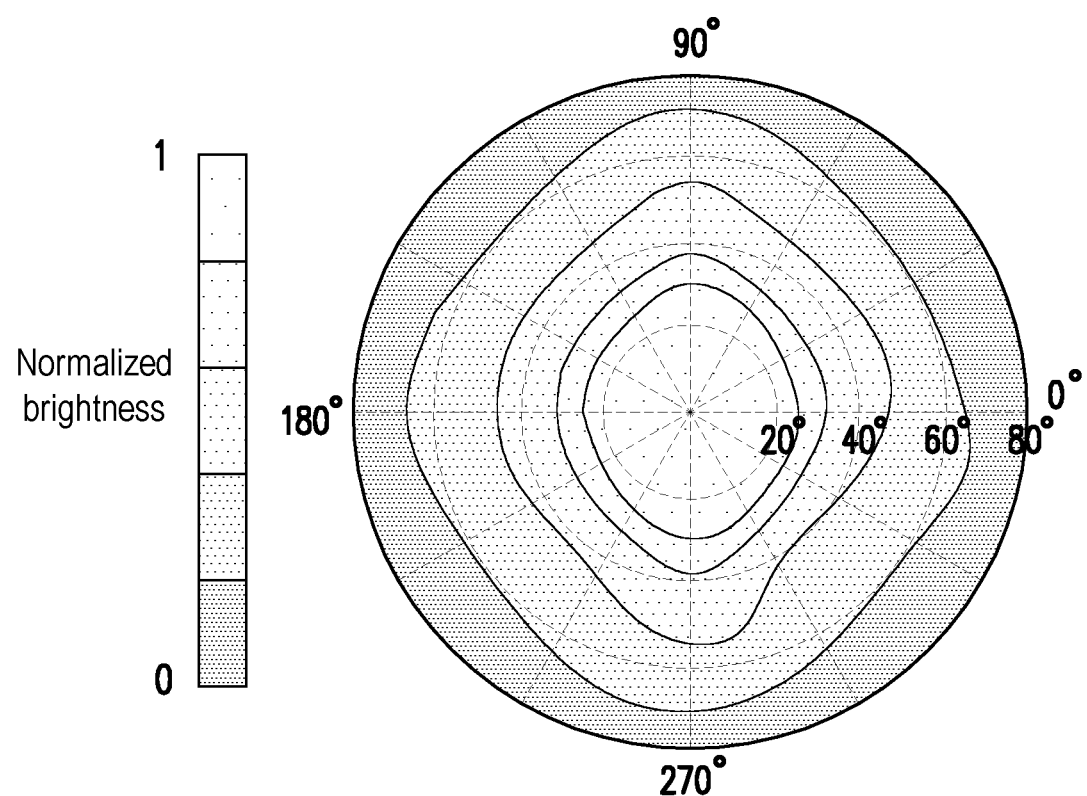
FIG. 4 shows the relationship between various viewing angles of the display apparatus 10 in the sharing mode and normalized brightness according to an embodiment of the disclosure.

FIG. 4 shows the relationship between various viewing angles of the display apparatus 10 in the sharing mode and normalized brightness according to an embodiment of the disclosure.

Referring to FIG. 1, FIG. 2 and FIG. 3, the switching panel 200 includes a first substrate 210, a second substrate 220 and a liquid crystal layer 230, wherein the liquid crystal layer 230 is disposed between the first substrate 210 and the second substrate 220. For example, in this embodiment, the plurality of liquid crystal molecules 232 of the liquid crystal layer 230 may be a plurality of negative liquid crystal molecules.

Please refer to FIG. 2 and FIG. 3, the first substrate 210 has a first base 211, a first electrode 212 disposed on the first base 211, a first insulating layer 213 disposed on the first electrode 212, and a second electrode 214 disposed on the first insulating layer 213. The second electrode 214 has a plurality of branch portions 214a, and the plurality of branch portions 214a of the second electrode 214 are arranged in the first direction y. In this embodiment, the second electrode 214 may also selectively include a trunk portion 214b that intersects the plurality of branch portions 214a.

In this embodiment, the first electrode 212 may be arranged as covering an entire surface, the first electrode 212 is disposed between the first base 211 and the first insulating layer 213, the first insulating layer 213 is disposed between the first electrode 212 and the second electrode 214, the second electrode 214 is disposed between the first insulating layer 213 and the liquid crystal layer 230, and the first electrode 212 overlaps in the plurality of gaps 214c between the plurality of branch portions 214a of the second electrode 214 and the plurality of branch portions 214a of the second electrode 214.

In this embodiment, the first base 211 of the first substrate 210, the first electrode 212 and the second electrode 214 are all transparent. For example, in this embodiment, the material of the first substrate 211 may be glass, quartz, organic polymer, or other suitable materials; the first electrode 212 and/or the second electrode 214 may be metal oxides, such as: indium tin oxide, indium zinc oxide, aluminum tin oxide, aluminum zinc oxide, indium germanium zinc oxide, other suitable oxides, or a stacked layer of at least two of the above, but the disclosure is not limited thereto.

In addition, in this embodiment, the material of the first insulating layer 213 may be an inorganic material (for example: silicon oxide, silicon nitride, silicon oxynitride, or a stacked layer of at least two of the above materials), an organic material, or a combination of the above.

Please refer to FIG. 2 and FIG. 3, the second substrate 220 has a second base 221, a third electrode 222 disposed on the second base 221, a second insulating layer 223 disposed on the third electrode 222 and a fourth electrode 224 disposed on the second insulating layer 223. The fourth electrode 224 has a plurality of branch portions 224a, and the plurality of branch portions 224a of the fourth electrode 224 are arranged in the second direction x. In this embodiment, the fourth electrode 224 may also selectively include a trunk portion 224b that intersects the plurality of branch portions 224a.

The plurality of branch portions 214a of the second electrode 214 of the first substrate 210 are arranged in the first direction y, and the plurality of branch portions 224a of the fourth electrode 224 of the second substrate 220 are arranged in the second direction x, wherein the first direction y is staggered with the second direction x. That is, a branch portion 214a of the second electrode 214 of the first substrate 210 and a branch portion 224a of the fourth electrode 224 of the second substrate 220 are disposed alternately and have an included angle θ. For example, in this embodiment, 80°≤θ≤100°; preferably, θ=90°, but the disclosure is not limited thereto.

In this embodiment, the third electrode 222 may be arranged as covering an entire surface. The third electrode 222 is disposed between the second base 221 and the second insulating layer 223, and the second insulating layer 223 is disposed between the third electrode 222 and the fourth electrode 224, the fourth electrode 224 is disposed between the second insulating layer 223 and the liquid crystal layer 230, and the third electrode 222 overlaps in a plurality of gaps 224c between the plurality of branch portions 224a of the fourth electrode 224 and the plurality of branch portions 224a of the fourth electrode 224.

In this embodiment, the second base 221 of the second substrate 220, the third electrode 222 and the fourth electrode 224 are all transparent. For example, in this embodiment, the material of the second base 221 may be glass, quartz, organic polymer, or other suitable materials; the third electrode 222 and/or the fourth electrode 224 may be metal oxides, such as: indium tin oxide, indium zinc oxide, aluminum tin oxide, aluminum zinc oxide, indium germanium zinc oxide, other suitable oxides, or a stacked layer of at least two of the above, but the disclosure is not limited thereto.

In addition, in this embodiment, the material of the second insulating layer 223 may be an inorganic material (for example: silicon oxide, silicon nitride, silicon oxynitride, or a stacked layer of at least two of the above materials), an organic material, or a combination of the above.

Referring to FIG. 1, the display apparatus 10 further includes a polarizer 150 and a polarizer 240. The polarizer 150 and the polarizer 240 are respectively disposed on opposite sides of the liquid crystal layer 230 of the switching panel 200. One polarizer 150 is located between the liquid crystal layer 230 of the switching panel 200 and the display panel 100, and the transmission axis 150a of the polarizer 150 and the transmission axis 240a of the polarizer 240 are substantially parallel to each other.

In this embodiment, the display medium 130 of the display panel 100 is an optically anisotropic material; for the purposes of display, one side of the display panel 100 is provided with the polarizer 150, and the other side of the display panel 100 is further provided with another polarizer 160, wherein the transmission axis 150a of the polarizer 150 and the transmission axis 160a of the polarizer 160 are substantially perpendicular to each other, but the disclosure is not limited thereto.

Please refer to FIG. 1, FIG. 2, FIG. 3 and FIG. 4, when the display apparatus 10 is in sharing mode, the first electrode 212, the second electrode 214, the third electrode 222 and the fourth electrode 224 of the switching panel 200 are not enabled, and the longitudinal axes 232a of the liquid crystal molecules 232 of the liquid crystal layer 230 are substantially perpendicular to the first base 211. In other words, the liquid crystal molecules 232 of the switching panel 200 are aligned vertically.

When the display apparatus 10 is in the sharing mode, the long axes 232a of the liquid crystal molecules 232 of the liquid crystal layer 230 are substantially perpendicular to the first base 211, and the polarization state of the light beam passing through the polarizer 240 in various directions is substantially unchanged after the light beam passes through the liquid crystal layer 230 of the switching panel 200, and thus the light beam can pass through the polarizer 150. Therefore, the user can view the display screen formed by the display panel 100 at various viewing angles.

Figure 5:
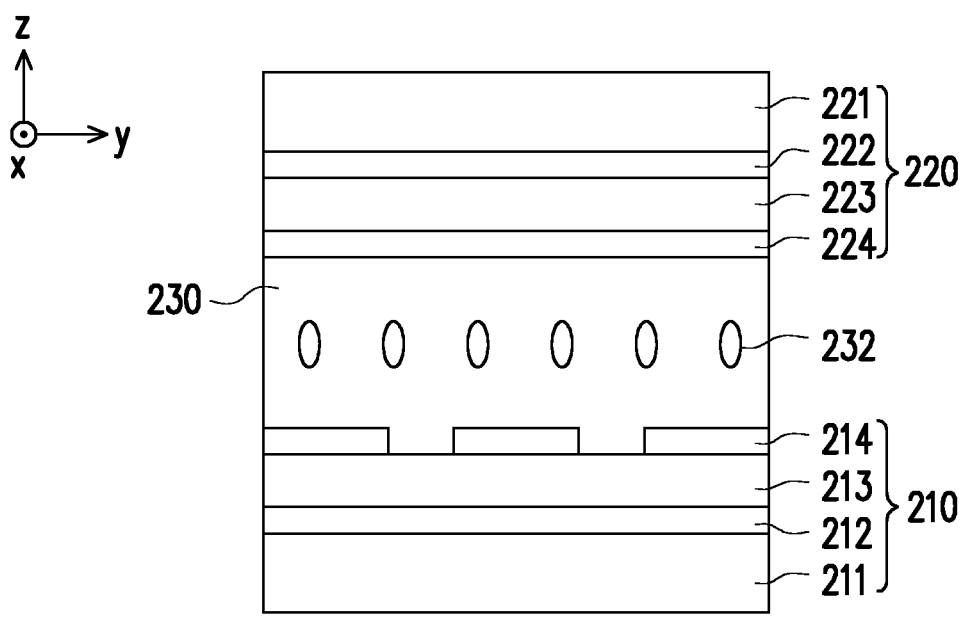
FIG. 5 is a schematic cross-sectional view of a switching panel 200 according to an embodiment of the disclosure.

FIG. 5 is a schematic cross-sectional view of a switching panel 200 according to an embodiment of the disclosure.

Figure 6:
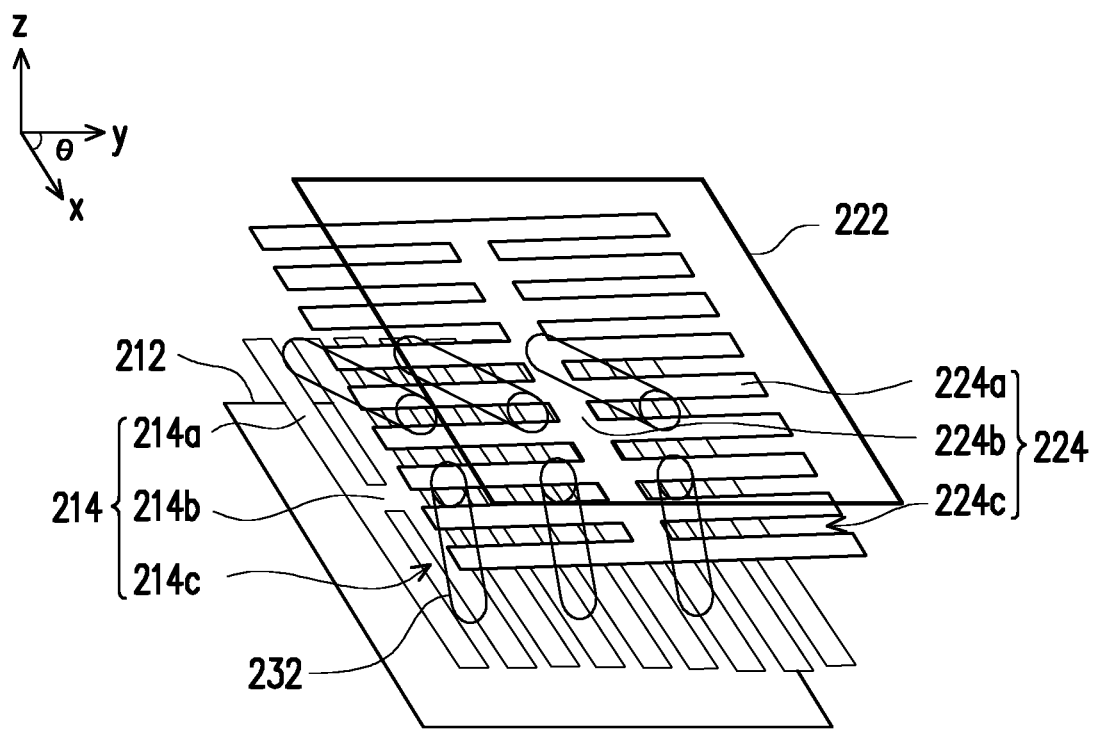
FIG. 6 is a perspective view of the first electrode 212, the second electrode 214, the third electrode 222, the fourth electrode 224, and the plurality of liquid crystal molecules 232 of the switching panel 200 of FIG. 5.

FIG. 6 is a perspective view of the first electrode 212, the second electrode 214, the third electrode 222, the fourth electrode 224, and the plurality of liquid crystal molecules 232 of the switching panel 200 of FIG. 5.

Specifically, FIG. 5 and FIG. 6 show the state of the switching panel 200 when the display apparatus 10 is in the first anti-peep mode.

For clarity, FIG. 5 and FIG. 6 depict a first direction y, a second direction x, and a third direction z that are perpendicular to each other.

Figure 7:
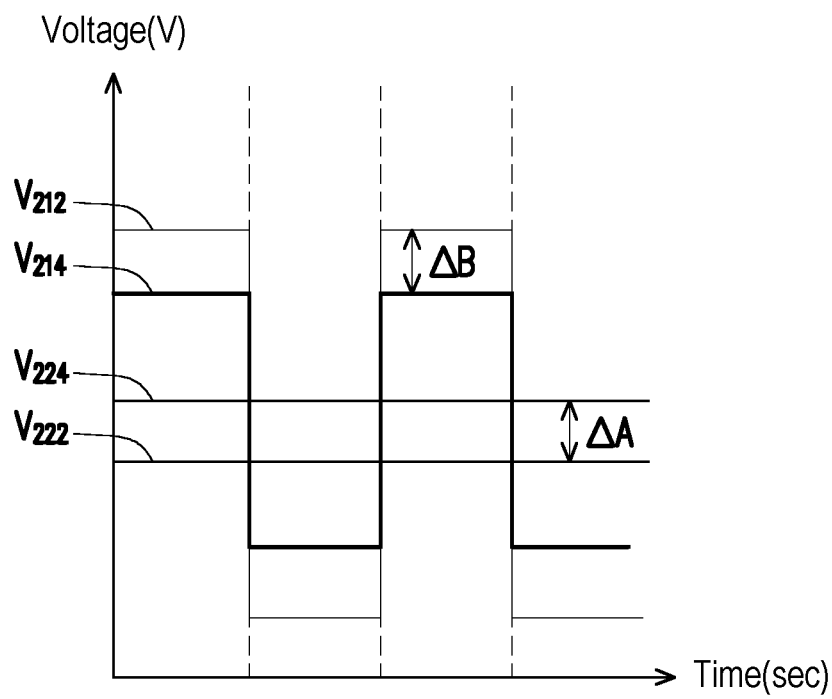
FIG. 7 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10 is in the first anti-peep mode according to an embodiment of the disclosure.

FIG. 7 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10 is in the first anti-peep mode according to an embodiment of the disclosure.

Figure 8:
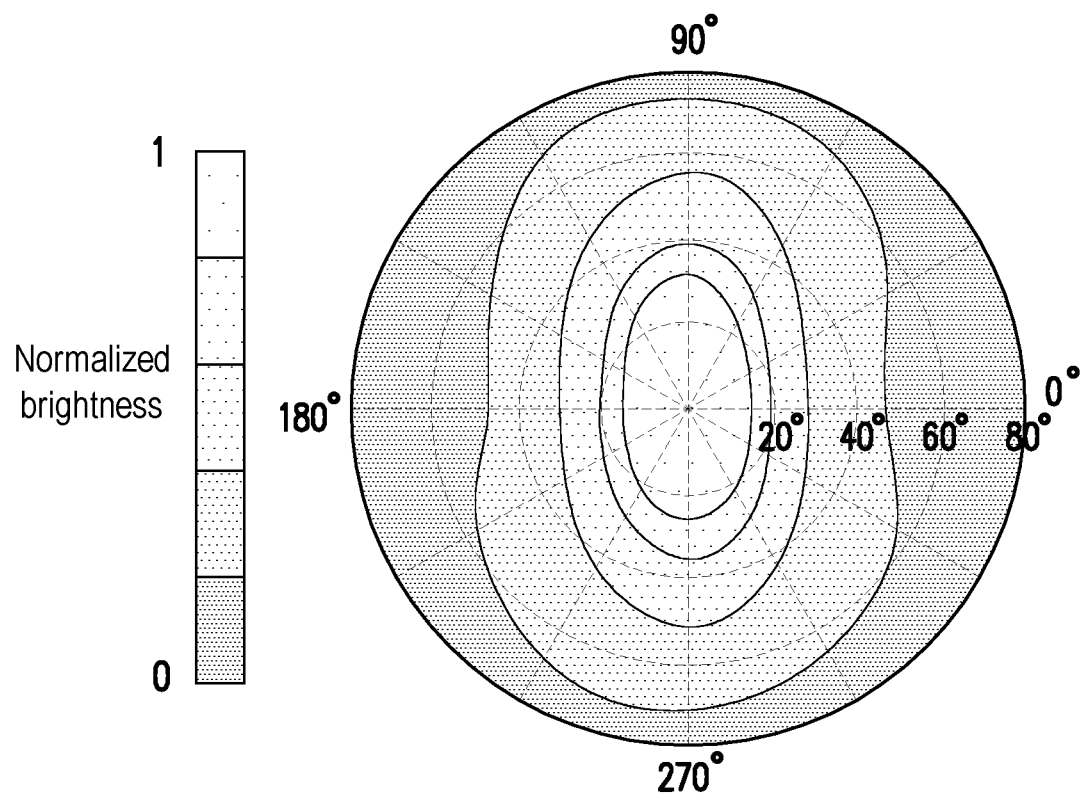
FIG. 8 shows the relationship between various viewing angles of the display apparatus 10 in the first anti-peep mode and normalized brightness according to an embodiment of the disclosure.

FIG. 8 shows the relationship between various viewing angles of the display apparatus 10 in the first anti-peep mode and normalized brightness according to an embodiment of the disclosure.

Please refer to FIG. 1, FIG. 5, FIG. 6, FIG. 7 and FIG. 8, in this embodiment, when the display apparatus 10 is in the first anti-peep mode, the signal $V_{212}$ of the first electrode 212 and the signal $V_{214}$ of the second electrode 214 of the first substrate 210 are respectively the first AC driving signal and the second AC driving signal that are in synchronization, and the signal $V_{222}$ of the third electrode 222 and the signal $V_{224}$ of the fourth electrode 224 of the second substrate 220 are a plurality of DC reference signals, respectively.

In this embodiment, when the display apparatus 10 is in the first anti-peep mode, there may be a potential difference ΔA between the signal $V_{222}$ of the third electrode 222 and the signal $V_{224}$ of the fourth electrode 224. For example, |ΔA| is greater than 0 volts and less than or equal to 1.5 volts. Specifically, in this embodiment, the signal $V_{222}$ of the third electrode 222 may be a DC signal fixed at 5.5 volts, the signal $V_{224}$ of the fourth electrode 224 may be a DC signal fixed at 6 volts, and an absolute value of the potential difference ΔA between the signal $V_{222}$ of the third electrode 222 and the signal $V_{224}$ of the fourth electrode 224 may be 0.5 volts, but the disclosure is not limited thereto.

In this embodiment, when the display apparatus 10 is in the first anti-peep mode, there may be a difference ΔB between the amplitude of the signal $V_{212}$ of the first electrode 212 and the amplitude of the signal $V_{214}$ of the second electrode 214. For example, in this embodiment, the signal $V_{212}$ of the first electrode 212 may be a square wave with a minimum value of 3 volts and a maximum value of 11 volts, and the signal $V_{214}$ of the second electrode 214 may be a square wave with a minimum value of 4 volts and a maximum value of 10 volts, and the amplitude of the signal $V_{212}$ of the first electrode 212 and the amplitude of the signal $V_{214}$ of the second electrode 214 may differ by 1 volt, but the disclosure is not limited thereto.

When the display apparatus 10 is in the first anti-peep mode, the liquid crystal molecules 232 of the liquid crystal layer 230 are affected by the potential difference between the first substrate 210 and the second substrate 220, and the longitudinal axes 232a of the liquid crystal molecules 232 of the liquid crystal layer 230 will incline along the plurality of branch portions 214a of the second electrode 214 of the first substrate 210. In other words, the longitudinal axes 232a of the liquid crystal molecules 232 of the liquid crystal layer 230 are substantially inclined in a vertical direction (for example, the second direction x in FIG. 2 and FIG. 3 and the opposite direction of the second direction x). The polarization state of the light beam transmitted on the x-z plane (i.e., the plane on which the second direction x and the third direction z are located) is substantially unchanged after the light beam passes through the polarizer 240 and the liquid crystal layer 230 in the above state. Most of the light beam can pass through the polarizer 150, and the display apparatus 10 is not anti-peeping in the vertical direction. On the other hand, the polarization state of the light beam transmitted on the y-z plane (i.e., the plane on which the first direction y and the third direction z are located) will be changed after the light beam passes through the polarizer 240 and the liquid crystal layer 230 in the above state. At least a part of the light beam will be blocked by the polarizer 150, and the display apparatus 10 is anti-peeping in the horizontal direction (for example: the first direction y in FIG. 2 and FIG. 3 and the opposite direction of the first direction y). That is, when the display apparatus 10 is in the first anti-peep mode, the anti-peep direction of the display apparatus 10 is the horizontal direction.

Figure 9:
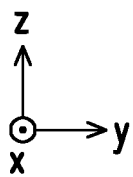
FIG. 9 shows the arrangement state of the liquid crystal molecules 232 of the liquid crystal layer 230 of the switching panel when the display apparatus 10 is in the first anti-peep mode according to an embodiment of the disclosure.
Figure 9:
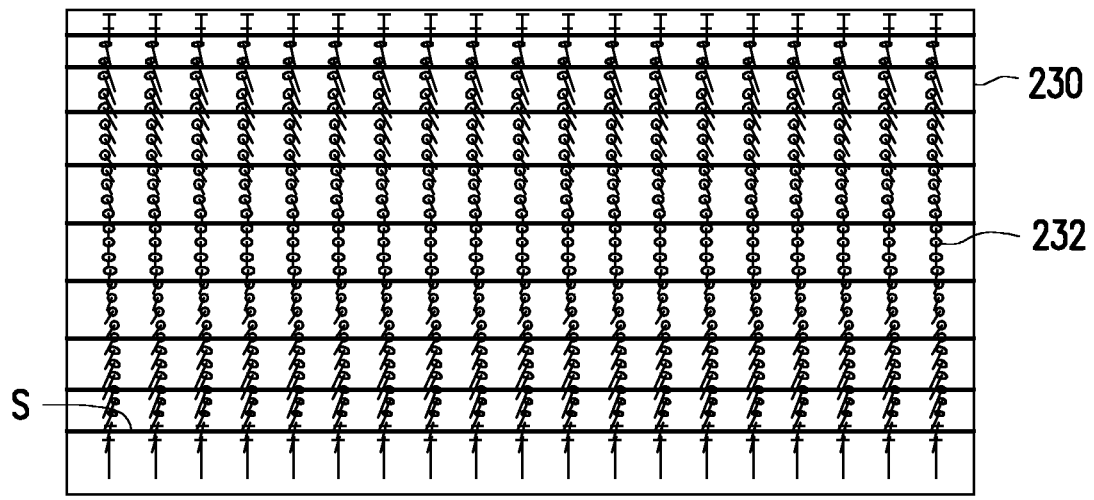

FIG. 9 shows the arrangement state of the liquid crystal molecules 232 of the liquid crystal layer 230 of the switching panel when the display apparatus 10 is in the first anti-peep mode according to an embodiment of the disclosure.

Figure 10:
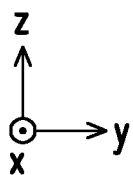
FIG. 10 shows the arrangement state of the liquid crystal molecules 232 of the liquid crystal layer 230 of the switching panel when the display apparatus of a comparative example is in the first anti-peep mode.
Figure 10:
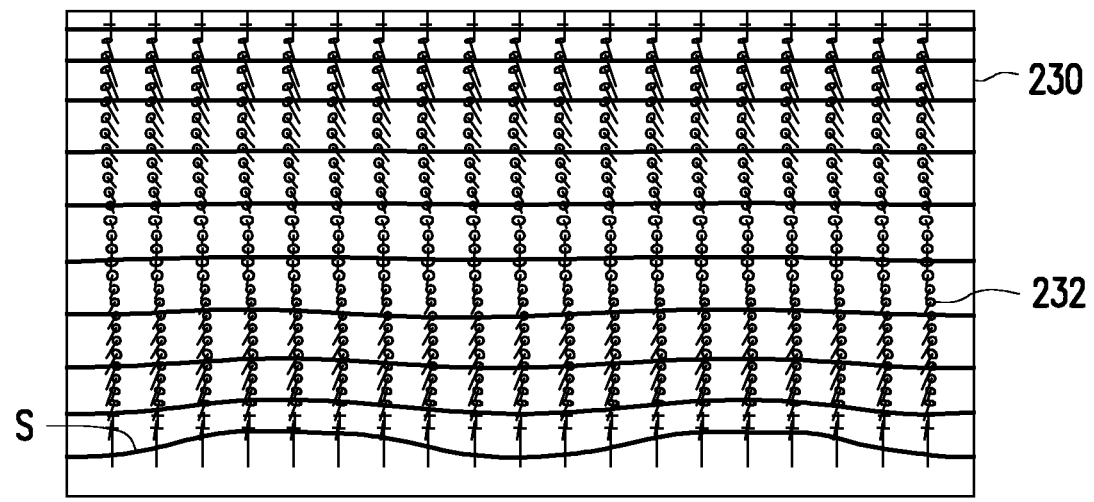

FIG. 10 shows the arrangement state of the liquid crystal molecules 232 of the liquid crystal layer 230 of the switching panel when the display apparatus of a comparative example is in the first anti-peep mode.

For clarity, FIG. 9 and FIG. 10 depict a first direction y, a second direction x, and a third direction z that are perpendicular to each other.

The display apparatus of the comparative example has the same structure as the display apparatus 10 of this embodiment, but the driving methods of the two are different. The difference between the driving method of the display apparatus of the comparative example and the driving method of the display apparatus 10 of this embodiment is that when the display apparatus of the comparative example is in the first anti-peep mode, there is no potential difference ΔA between the signal $V_{222}$ of the third electrode 222 and the signal $V_{224}$ of the fourth electrode 224 of the display apparatus of the comparative example.

Comparing FIG. 9 and FIG. 10, it can be found that in this embodiment (i.e., in the embodiment of FIG. 7 and FIG. 9), there is a potential difference ΔA between the signal $V_{222}$ of the third electrode 222 and the signal $V_{224}$ of the fourth electrode 224 of the display apparatus 10, which allows the equipotential surface S formed in the liquid crystal layer 230 to be relatively flat, thereby facilitating the anti-peeping and/or display effect of the display apparatus 10. In contrast to the comparative example, there is no potential difference ΔA between the signal $V_{222}$ of the third electrode 222 and the signal $V_{224}$ of the fourth electrode 224 of the display apparatus of the comparative example, and therefore the equipotential surface S formed in the liquid crystal layer 230 is less flat, which is not conducive to the anti-peeping and/or display effect of the display apparatus of the comparative example.

Figure 11:
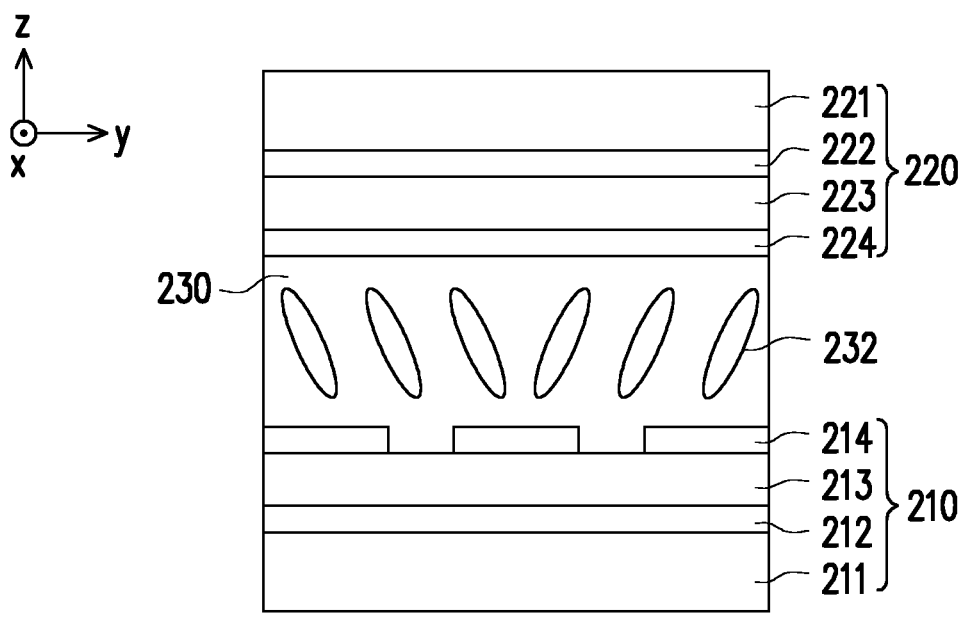
FIG. 11 is a schematic cross-sectional view of a switching panel 200 according to an embodiment of the disclosure.

FIG. 11 is a schematic cross-sectional view of a switching panel 200 according to an embodiment of the disclosure.

Figure 12:
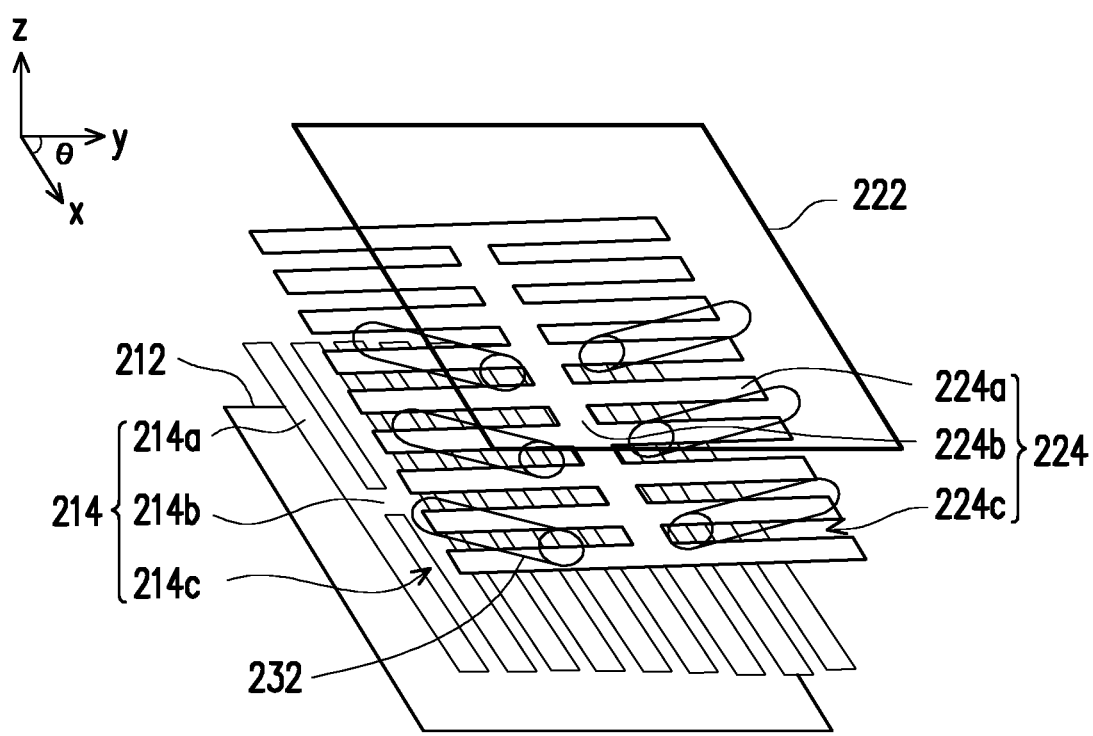
FIG. 12 is a schematic perspective view of the first electrode 212, the second electrode 214, the third electrode 222, the fourth electrode 224, and the plurality of liquid crystal molecules 232 of the switching panel 200 of FIG. 11.

FIG. 12 is a schematic perspective view of the first electrode 212, the second electrode 214, the third electrode 222, the fourth electrode 224, and the plurality of liquid crystal molecules 232 of the switching panel 200 of FIG. 11.

Specifically, FIG. 11 and FIG. 12 show the state of the switching panel 200 when the display apparatus 10 is in the second anti-peep mode.

For clarity, FIG. 11 and FIG. 12 depict a first direction y, a second direction x, and a third direction z that are perpendicular to each other.

Figure 13:
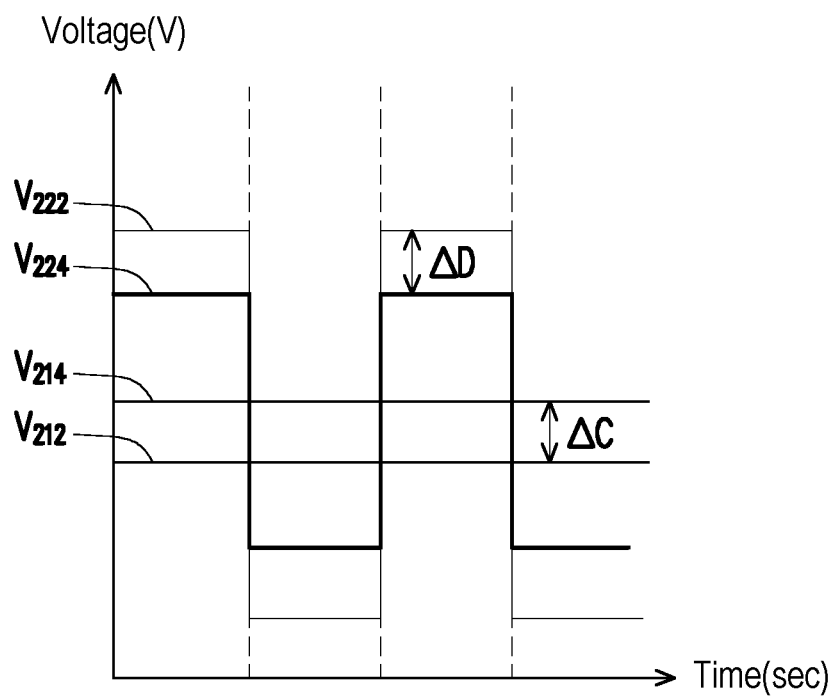
FIG. 13 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10 is in the second anti-peep mode according to an embodiment of the disclosure.

FIG. 13 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10 is in the second anti-peep mode according to an embodiment of the disclosure.

Figure 14:
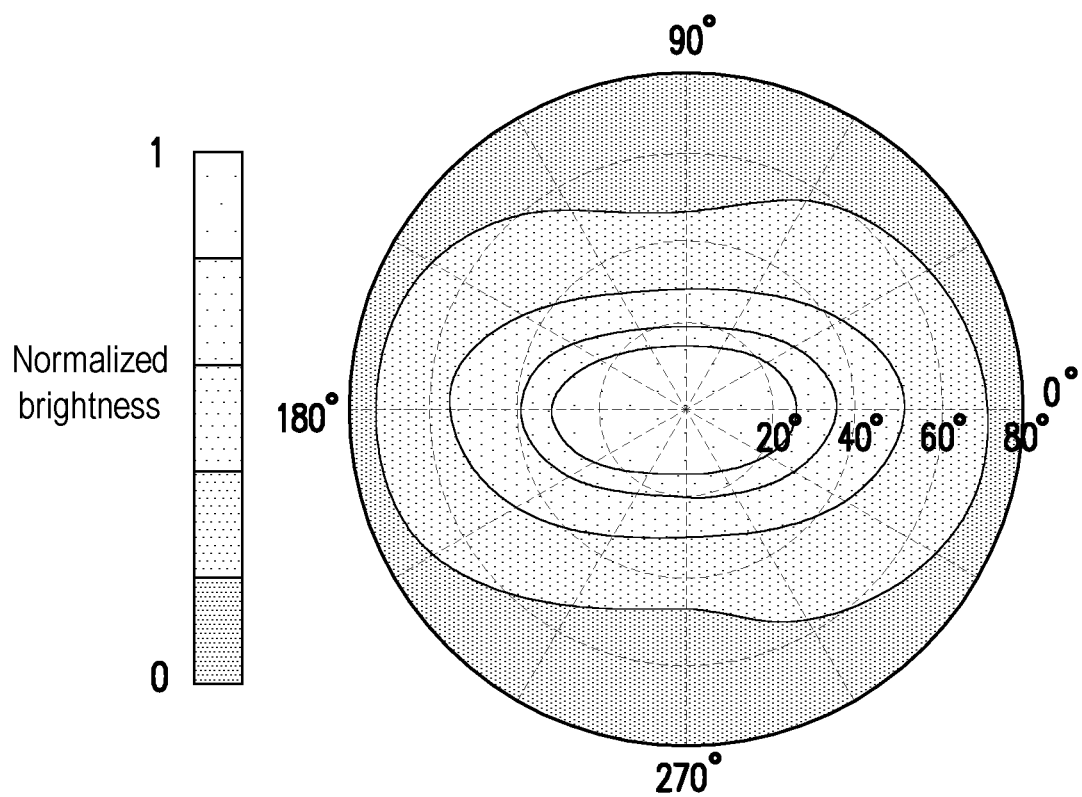
FIG. 14 shows the relationship between various viewing angles of the display apparatus 10 in the second anti-peep mode and normalized brightness according to an embodiment of the disclosure.

FIG. 14 shows the relationship between various viewing angles of the display apparatus 10 in the second anti-peep mode and normalized brightness according to an embodiment of the disclosure.

For clarity, FIG. 11 and FIG. 12 depict a first direction y, a second direction x, and a third direction z that are perpendicular to each other.

Please refer to FIG. 1, FIG. 11, FIG. 12, FIG. 13 and FIG. 14, in this embodiment, when the display apparatus 10 is in the second anti-peep mode, the signal $V_{222}$ of the third electrode 222 and the signal $V_{224}$ of the fourth electrode 224 of the second substrate 220 are respectively the third AC driving signal and fourth AC driving signal that are in synchronization, and the signal $V_{212}$ of the first electrode 212 and the signal $V_{214}$ of the second electrode 214 of the first substrate 210 are a plurality of DC reference signals, respectively.

In this embodiment, when the display apparatus 10 is in the second anti-peep mode, there may be a potential difference ΔC between the signal $V_{212}$ of the first electrode 212 and the signal $V_{214}$ of the second electrode 214. For example, |ΔC| is greater than 0 volts and less than or equal to 1.5 volts. Specifically, in this embodiment, the signal $V_{212}$ of the first electrode 212 may be a DC signal fixed at 5.5 volts, the signal $V_{214}$ of the second electrode 214 may be a DC signal fixed at 6 volts, and an absolute value of the potential difference ΔA between the signal $V_{212}$ of the first electrode 212 and the signal $V_{214}$ of the second electrode 214 may be 0.5 volts, but the disclosure is not limited thereto.

In this embodiment, when the display apparatus 10 is in the second anti-peep mode, there may be a difference ΔD between the amplitude of the signal $V_{222}$ of the third electrode 222 and the amplitude of the signal $V_{224}$ of the fourth electrode 224. For example, in this embodiment, the signal $V_{222}$ of the third electrode 222 may be a square wave with a minimum value of 3 volts and a maximum value of 11 volts, and the signal $V_{224}$ of the fourth electrode 224 may be a square wave with a minimum value of 4 volts and a maximum value of 10 volts, and the amplitude of the signal $V_{222}$ of the third electrode 222 and the amplitude of the signal $V_{224}$ of the fourth electrode 224 may differ by 1 volt, but the disclosure is not limited thereto.

When the display apparatus 10 is in the second anti-peep mode, the liquid crystal molecules 232 of the liquid crystal layer 230 are affected by the potential difference between the first substrate 210 and the second substrate 220, and the longitudinal axes 232a of the liquid crystal molecules 232 of the liquid crystal layer 230 will incline along the plurality of branch portions 224a of the fourth electrode 224 of the second substrate 220. In other words, the longitudinal axes 232a of the liquid crystal molecules 232 of the liquid crystal layer 230 are substantially inclined in a horizontal direction (for example, the first direction y in FIG. 11 and FIG. 12 and the opposite direction of the first direction y). The polarization state of the light beam transmitted on the y-z plane (i.e., the plane on which the first direction y and the third direction z are located) is substantially unchanged after the light beam passes through the polarizer 240 and the liquid crystal layer 230 in the above state. Most of the light beam can pass through the polarizer 150, and the display apparatus 10 is substantially not anti-peeping in the horizontal direction. On the other hand, the polarization state of the light beam transmitted on the x-z plane (i.e., the plane on which the second direction x and the third direction z are located) will be changed after the light beam passes through the polarizer 240 and the liquid crystal layer 230 in the above state. At least a part of the light beam will be blocked by the polarizer 150, and the display apparatus 10 is anti-peeping in the vertical direction (for example: the second direction x in FIG. 11 and FIG. 12 and the opposite direction of the second direction x). That is, when the display apparatus 10 is in the second anti-peep mode, the anti-peep direction of the display apparatus 10 is the vertical direction.

Figure 15:
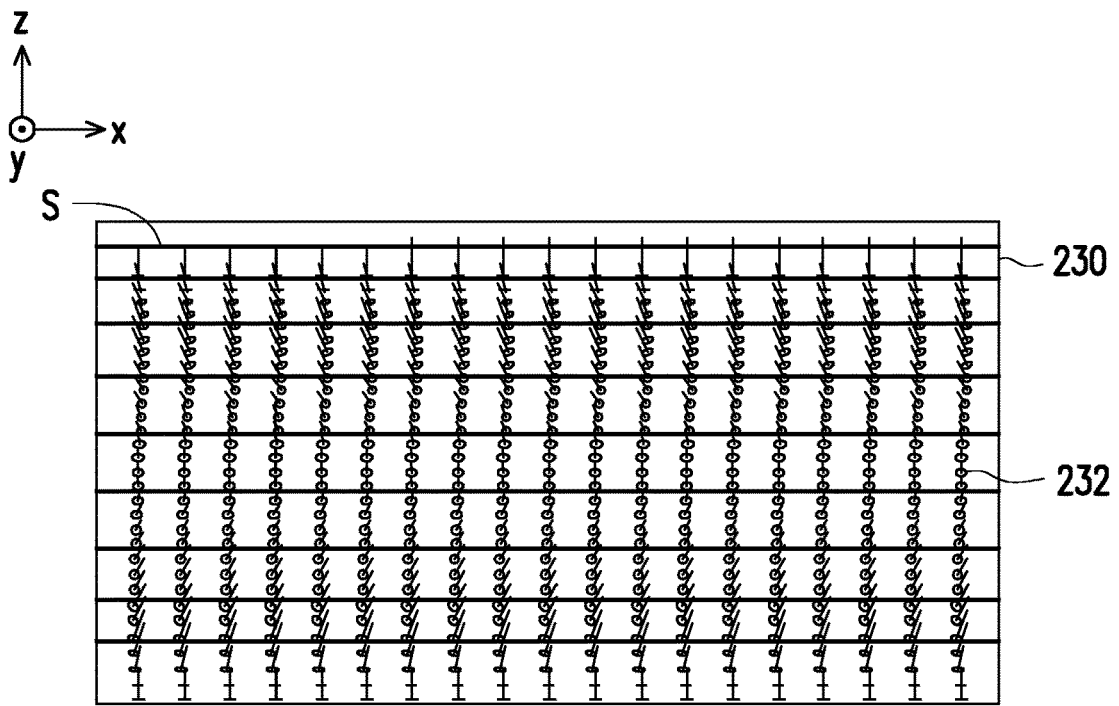
FIG. 15 shows the arrangement state of the liquid crystal molecules 232 of the liquid crystal layer 230 of the switching panel when the display apparatus 10 is in the second anti-peep mode according to an embodiment of the disclosure.

FIG. 15 shows the arrangement state of the liquid crystal molecules 232 of the liquid crystal layer 230 of the switching panel when the display apparatus 10 is in the second anti-peep mode according to an embodiment of the disclosure.

Figure 16:
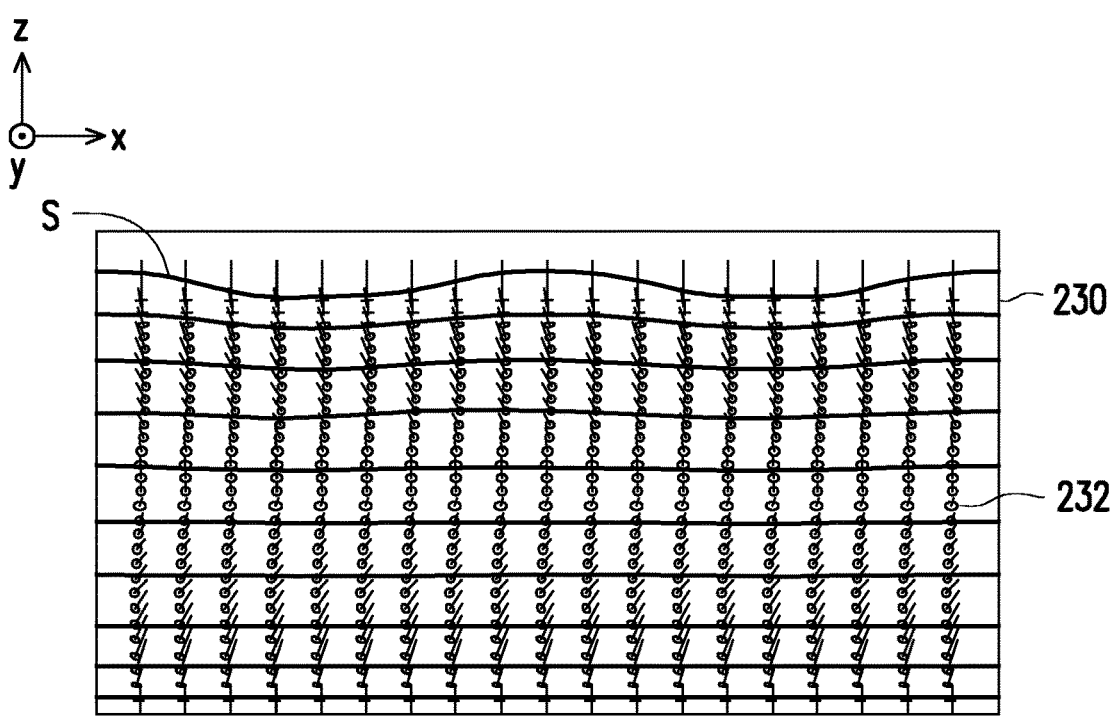
FIG. 16 shows the arrangement state of the liquid crystal molecules 232 of the liquid crystal layer 230 of the switching panel when the display apparatus in a comparative example is in the second anti-peep mode.

FIG. 16 shows the arrangement state of the liquid crystal molecules 232 of the liquid crystal layer 230 of the switching panel when the display apparatus in a comparative example is in the second anti-peep mode.

For clarity, FIG. 15 and FIG. 16 depict a first direction y, a second direction x, and a third direction z that are perpendicular to each other.

The display apparatus of the comparative example has the same structure as the display apparatus 10 of this embodiment, but the driving methods of the two are different. The difference between the driving method of the display apparatus of the comparative example and the driving method of the display apparatus 10 of this embodiment is that when the display apparatus of the comparative example is in the second anti-peep mode, there is no potential difference ΔC between the signal $V_{212}$ of the first electrode 212 and the signal $V_{214}$ of the second electrode 214 of the display apparatus of the comparative example.

Comparing FIG. 15 and FIG. 16, it can be found that in this embodiment (i.e., in the embodiment of FIG. 13 and FIG. 15), there is a potential difference ΔC between the signal $V_{212}$ of the first electrode 212 and the signal $V_{214}$ of the second electrode 214 of the display apparatus 10, which allows the equipotential surface S formed in the liquid crystal layer 230 to be relatively flat, thereby facilitating the anti-peeping effect of the display apparatus 10. In contrast to the comparative example, there is no potential difference ΔC between the signal $V_{212}$ of the first electrode 212 and the signal $V_{214}$ of the second electrode 214 of the display apparatus of the comparative example, and therefore the equipotential surface S formed in the liquid crystal layer 230 is less flat, which is not conducive to the anti-peeping effect of the display apparatus of the comparative example.

It should be noted here that the following embodiments use the reference numbers and partial contents of the foregoing embodiments, wherein the same reference numbers are used to indicate the same or similar elements, and the description of the same technical content is omitted. For the description of the omitted parts, reference may be made to the foregoing embodiments, and the same content will not be narrated in the following embodiment.

Figure 17:
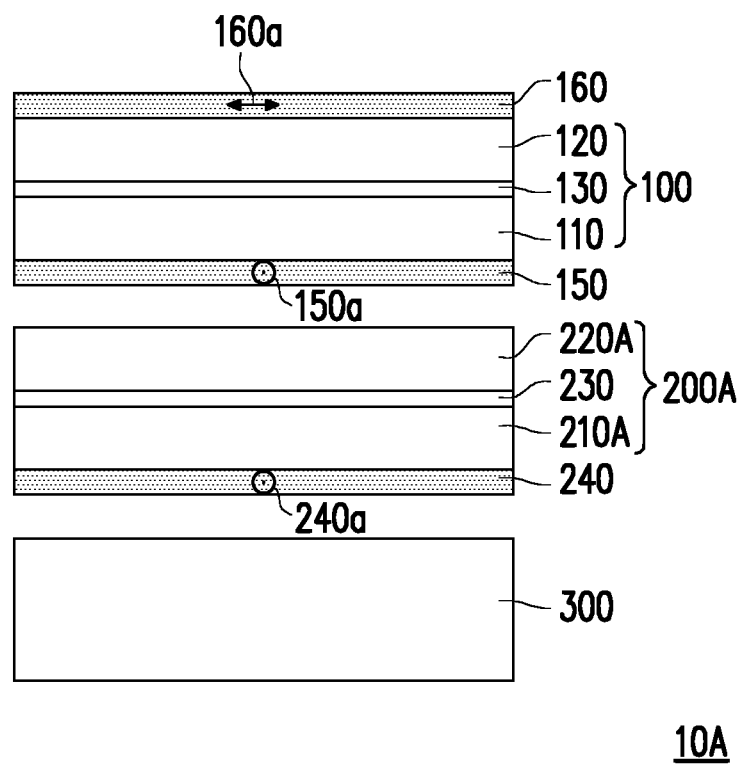
FIG. 17 is a schematic cross-sectional view of a display apparatus 10A according to another embodiment of the disclosure.

FIG. 17 is a schematic cross-sectional view of a display apparatus 10A according to another embodiment of the disclosure.

Figure 18:
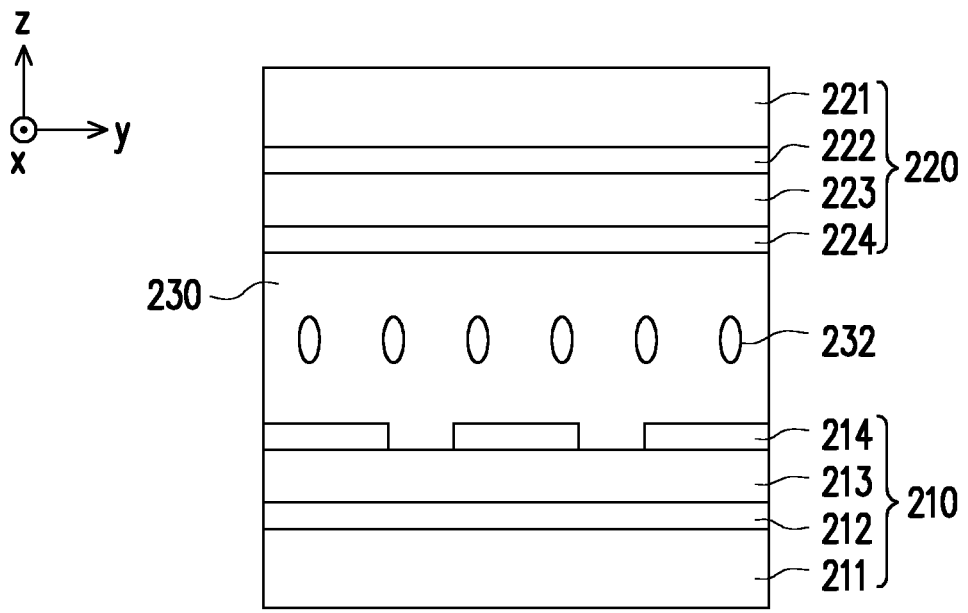
FIG. 18 is a schematic cross-sectional view of a switching panel 200 according to another embodiment of the disclosure.

FIG. 18 is a schematic cross-sectional view of a switching panel 200 according to another embodiment of the disclosure.

Figure 19:
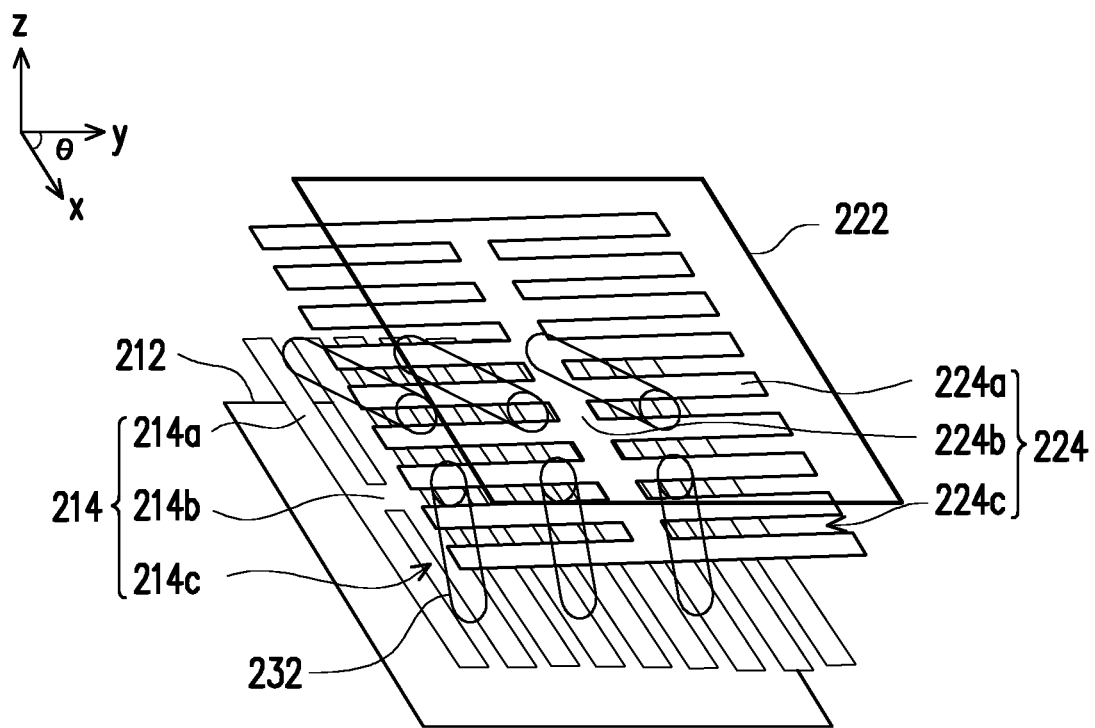
FIG. 19 is a schematic perspective view of the first electrode 212, the second electrode 214, the third electrode 222, the fourth electrode 224, and the plurality of liquid crystal molecules 232 of the switching panel 200 of FIG. 18.

FIG. 19 is a schematic perspective view of the first electrode 212, the second electrode 214, the third electrode 222, the fourth electrode 224, and the plurality of liquid crystal molecules 232 of the switching panel 200 of FIG. 18.

Specifically, FIG. 18 and FIG. 19 show the state of the switching panel 200 when the display apparatus 10A is in the first anti-peep mode.

For clarity, FIG. 18 and FIG. 19 depict a first direction y, a second direction x, and a third direction z that are perpendicular to each other.

Figure 20:
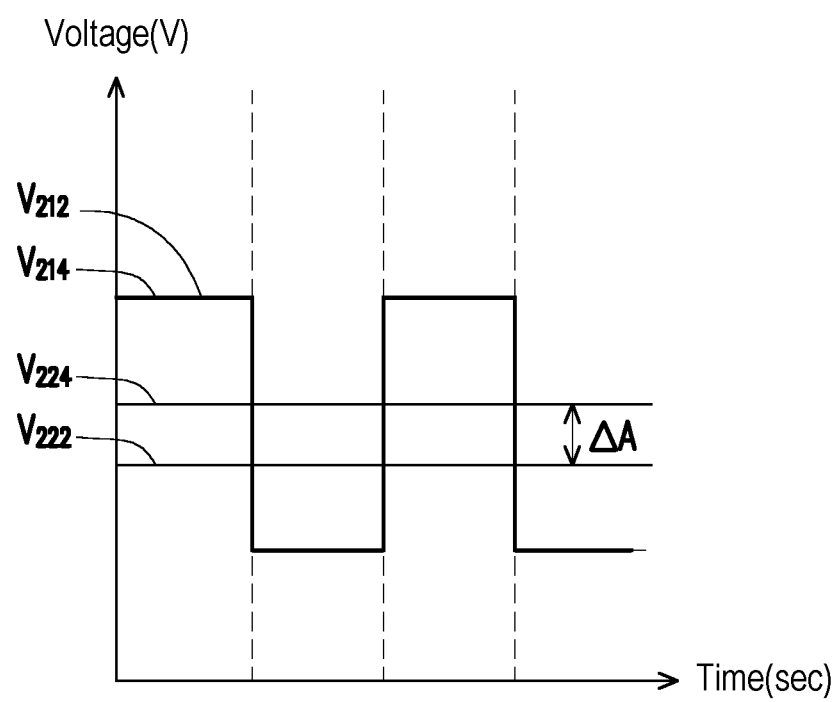
FIG. 20 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10A is in the first anti-peep mode according to another embodiment of the disclosure.

FIG. 20 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10A is in the first anti-peep mode according to another embodiment of the disclosure.

Figure 21:
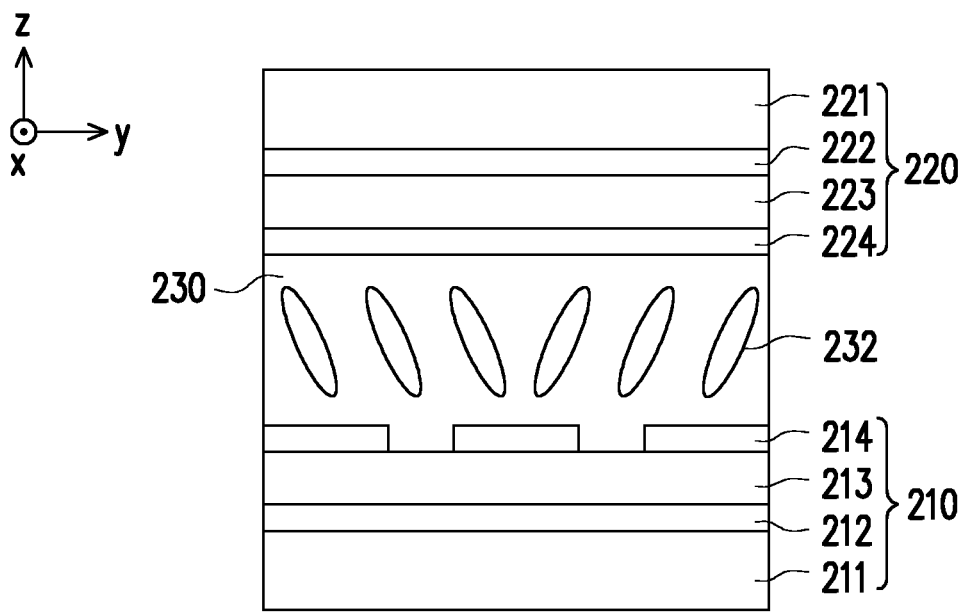
FIG. 21 is a schematic cross-sectional view of a switching panel 200 according to another embodiment of the disclosure.

FIG. 21 is a schematic cross-sectional view of a switching panel 200 according to another embodiment of the disclosure.

Figure 22:
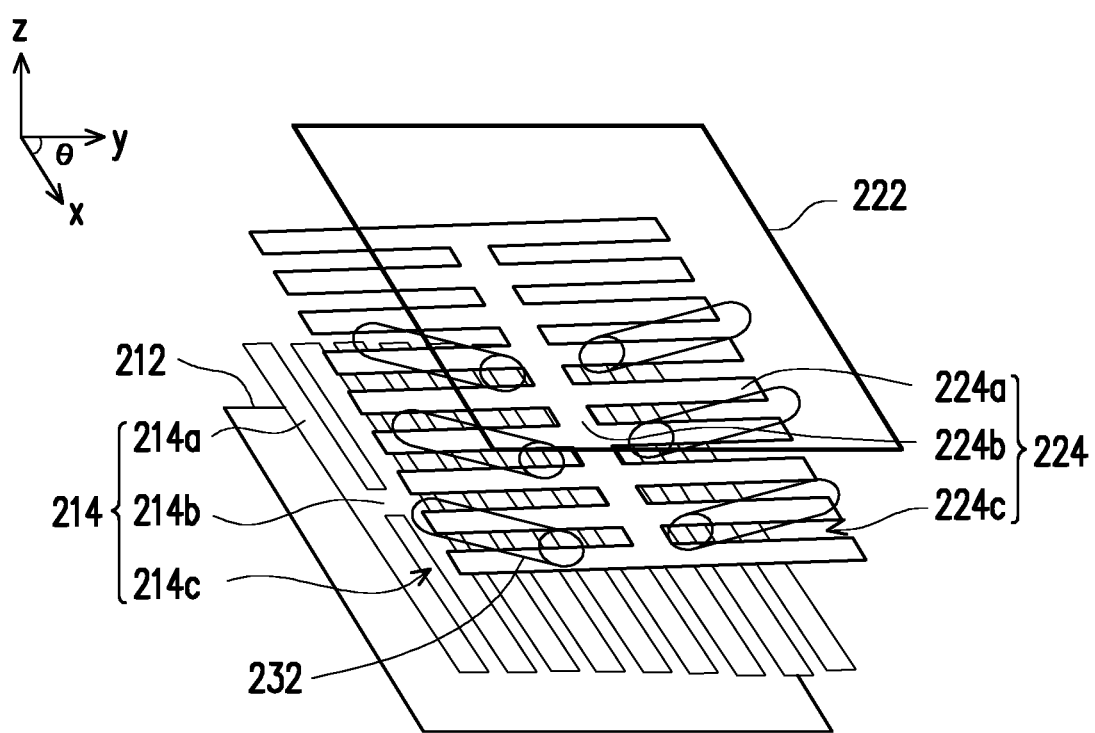
FIG. 22 is a schematic perspective view of the first electrode 212, the second electrode 214, the third electrode 222, the fourth electrode 224, and the plurality of liquid crystal molecules 232 of the switching panel 200 of FIG. 21.

FIG. 22 is a schematic perspective view of the first electrode 212, the second electrode 214, the third electrode 222, the fourth electrode 224, and the plurality of liquid crystal molecules 232 of the switching panel 200 of FIG. 21.

Specifically, FIG. 21 and FIG. 22 show the state of the switching panel 200 when the display apparatus 10A is in the second anti-peep mode.

For clarity, FIG. 21 and FIG. 22 depict a first direction y, a second direction x, and a third direction z that are perpendicular to each other.

Figure 23:
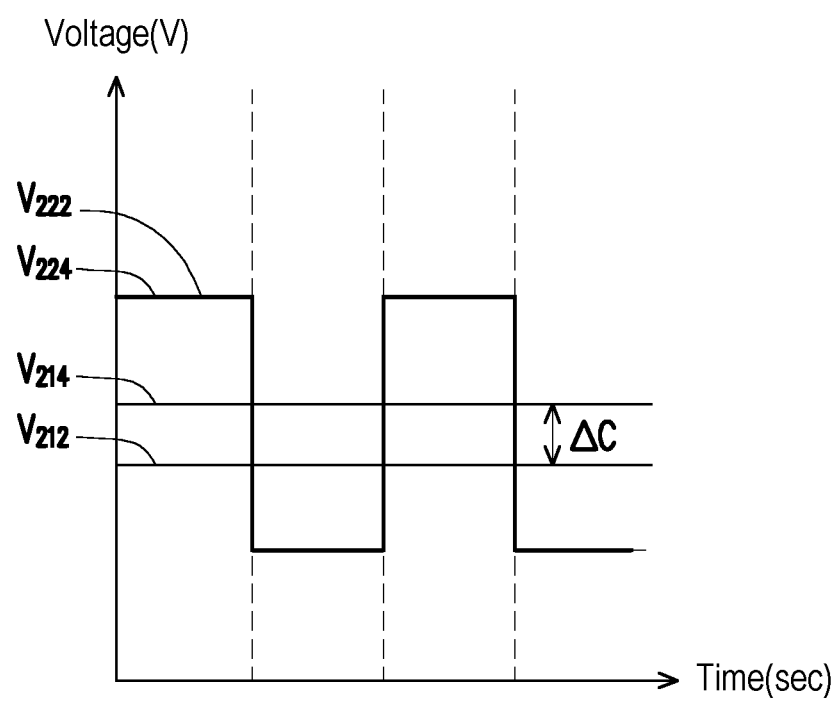
FIG. 23 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10A is in the second anti-peep mode according to another embodiment of the disclosure.

FIG. 23 shows the signal $V_{212}$ of the first electrode 212, the signal $V_{214}$ of the second electrode 214, the signal $V_{222}$ of the third electrode 222, and the signal $V_{224}$ of the fourth electrode 224 of the switching panel 200 when the display apparatus 10A is in the second anti-peep mode according to another embodiment of the disclosure.

The display apparatus 10A of this embodiment has the same structure as the display apparatus 10 of the foregoing embodiment, but the driving methods of the two are different.

Please refer to FIG. 17, FIG. 18, FIG. 19 and FIG. 20. In this embodiment, when the display apparatus 10A is in the first anti-peep mode, the signal $V_{212}$ of the first electrode 212 and the signal $V_{214}$ of the second electrode 214 of the first substrate 210 are respectively the first AC driving signal and the second AC driving signal that are in synchronization, and the signal $V_{222}$ of the third electrode 222 and the signal $V_{224}$ of the fourth electrode 224 of the second substrate 220 may be a plurality of DC reference signals, respectively.

In this embodiment, when the display apparatus 10A is in the first anti-peep mode, there may be a potential difference ΔA between the signal $V_{222}$ of the third electrode 222 and the signal $V_{224}$ of the fourth electrode 224. For example, |ΔA| is greater than 0 volts and less than or equal to 1.5 volts. Specifically, in this embodiment, the signal $V_{222}$ of the third electrode 222 may be a DC signal fixed at 5.5 volts, the signal $V_{224}$ of the fourth electrode 224 may be a DC signal fixed at 6 volts, and an absolute value of the potential difference ΔA between the signal $V_{222}$ of the third electrode 222 and the signal $V_{224}$ of the fourth electrode 224 may be 0.5 volts, but the disclosure is not limited thereto.

The difference between the display apparatus 10A and the display apparatus 10 of the previous embodiment is that when the display apparatus 10A is in the first anti-peep mode, the amplitude of the signal $V_{212}$ of the first electrode 212 and the amplitude of the signal $V_{214}$ of the second electrode 214 are substantially equal to each other. For example, in this embodiment, the signal $V_{212}$ of the first electrode 212 and the signal $V_{214}$ of the second electrode 214 are both square waves with a minimum value of 4 volts and a maximum value of 10 volts, but the disclosure is not limited thereto.

Please refer to FIG. 17, FIG. 21, FIG. 22 and FIG. 23. In this embodiment, when the display apparatus 10A is in the second anti-peep mode, the signal $V_{222}$ of the third electrode 222 and the signal $V_{224}$ of the fourth electrode 224 of the second substrate 220 are respectively the third AC driving signal and the fourth AC driving signal that are in synchronization, and the signal $V_{212}$ of the first electrode 212 and the signal $V_{214}$ of the second electrode 214 of the first substrate 210 may be a plurality of DC reference signals, respectively.

In this embodiment, when the display apparatus 10A is in the second anti-peep mode, there may be a potential difference ΔC between the signal $V_{212}$ of the first electrode 212 and the signal $V_{214}$ of the second electrode 214. For example, |ΔC| is greater than 0 volts and less than or equal to 1.5 volts. Specifically, in this embodiment, the signal $V_{212}$ of the first electrode 212 may be a DC signal fixed at 5.5 volts, the signal $V_{214}$ of the second electrode 214 may be a DC signal fixed at 6 volts, and an absolute value of the potential difference ΔC between the signal $V_{212}$ of the first electrode 212 and the signal $V_{214}$ of the second electrode 214 may be 0.5 volts, but the disclosure is not limited thereto.

The difference between the display apparatus 10A and the display apparatus 10 of the previous embodiment is that when the display apparatus 10A is in the second anti-peep mode, the amplitude of the signal $V_{222}$ of the third electrode 222 and the amplitude of the signal $V_{224}$ of the fourth electrode 224 are substantially equal to each other. For example, in this embodiment, the signal $V_{222}$ of the third electrode 222 and the signal $V_{224}$ of the fourth electrode 224 both may be square waves with a minimum value of 4 volts and a maximum value of 10 volts, but the disclosure is not limited thereto.

Figure 24:
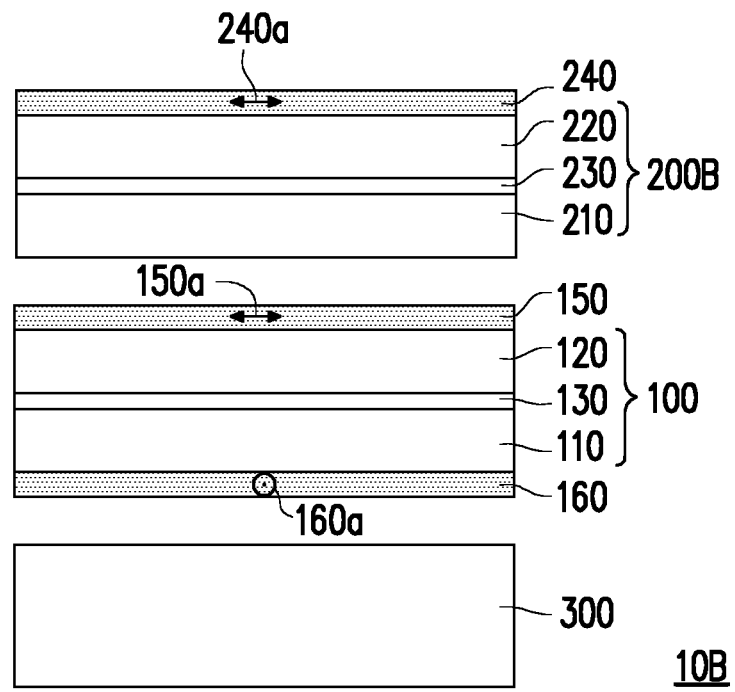
FIG. 24 is a schematic cross-sectional view of a display apparatus 10B according to yet another embodiment of the disclosure.

FIG. 24 is a schematic cross-sectional view of a display apparatus 10B according to yet another embodiment of the disclosure. The display apparatus 10B of FIG. 24 is similar to the display apparatus 10 of FIG. 1, and the difference between the two is that in the embodiment of FIG. 24, the display panel 100 is located between the switching panel 200 and the backlight module 300. In other words, the switching panel 200 can also be disposed on the display panel 100.

Figure 25:
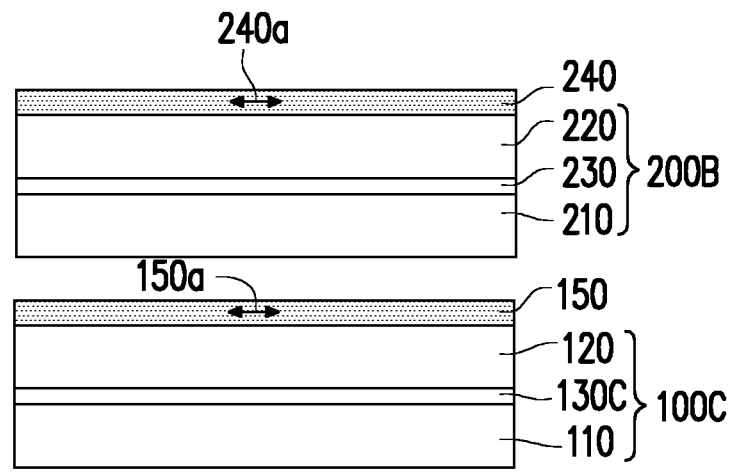
FIG. 25 is a schematic cross-sectional view of a display apparatus 10C according to still another embodiment of the disclosure.

FIG. 25 is a schematic cross-sectional view of a display apparatus 10C according to still another embodiment of the disclosure. The display apparatus 10C of FIG. 25 is similar to the display apparatus 10 of FIG. 1, the difference between the two is that: in the embodiment of FIG. 25, the display medium 130C of the display panel 100C may be a self-luminous display medium, such as but not limited to: organic light emitting diode (OLED) or a micro LED (μLED), the backlight module 300 can be omitted from the display apparatus 10C, and the switching panel 200 is disposed on the display panel 100C.

A first electrode 212, a second electrode 214, a third electrode 222 and a fourth electrode 224 can be regarded as a switching electrode set. In the above embodiments, the switching panel 200 is configured with a switching electrode set as an example. However, the disclosure is not limited thereto. A switching panel 200 may also include a plurality of switching electrode sets overlapping the multiple display areas of the display panel 100 or 100C, respectively, so that the user can choose whether each display area has the anti-peeping function and/or choose the anti-peeping direction of each display area according to needs.

What is claimed is:

1. A display apparatus, comprising:
a display panel; and
a switching panel provided outside the display panel, wherein the switching panel comprises:
a first base;
a first electrode disposed on the first base;
a first insulating layer disposed on the first electrode;
a second electrode disposed on the first insulating layer, wherein the second electrode has a plurality of branch portions, and the plurality of branch portions of the second electrode are arranged in a first direction;
a second base disposed opposite to the first base;
a third electrode disposed on the second base;
a second insulating layer disposed on the third electrode;
a fourth electrode disposed on the second insulating layer, wherein the fourth electrode has a plurality of branch portions, and the plurality of branch portions of the fourth electrode are arranged in a second direction, and the first direction and the second direction intersect with each other; and
a liquid crystal layer disposed between the first base and the second base;
wherein, when the display apparatus is in a first anti-peep mode, the first electrode and the second electrode provided on the first base respectively have a first AC driving signal and a second AC driving signal that are in synchronization, and the third electrode and the fourth electrode provided on the second base have a plurality of DC reference signals, respectively.

2. The display apparatus according to claim 1, wherein when the display apparatus is in the first anti-peep mode, there is a difference ΔB between an amplitude of the first AC driving signal and an amplitude of the second AC driving signal.

3. The display apparatus according to claim 1, wherein when the display apparatus is in the first anti-peep mode, an amplitude of the first AC driving signal and an amplitude of the second AC driving signal are substantially equal to each other.

4. The display apparatus according to claim 1, wherein when the display apparatus is in the first anti-peep mode, there is a potential difference ΔA between the plurality of DC reference signals of the third electrode and the fourth electrode.

5. The display apparatus according to claim 4, wherein |ΔA| is greater than 0 volts and less than or equal to 1.5 volts.

6. The display apparatus according to claim 1, wherein when the display apparatus is in a second anti-peep mode, the third electrode and the fourth electrode provided on the second base respectively have a third AC driving signal and a fourth AC driving signal that are in synchronization, and the first electrode and the second electrode provided on the first base have a plurality of DC reference signals, respectively.

7. The display apparatus according to claim 6, wherein when the display apparatus is in the second anti-peep mode, there is a difference ΔD between an amplitude of the third AC driving signal and an amplitude of the fourth AC driving signal.

8. The display apparatus according to claim 6, wherein when the display apparatus is in the second anti-peep mode, an amplitude of the third AC driving signal and an amplitude of the fourth AC driving signal are substantially equal to each other.

9. The display apparatus according to claim 6, wherein when the display apparatus is in the second anti-peep mode, there is a potential difference ΔC between the plurality of DC reference signals of the first electrode and the second electrode.

10. The display apparatus according to claim 9, wherein |ΔC| is greater than 0 volts and less than or equal to 1.5 volts.

11. The display apparatus according to claim 1, wherein when the display apparatus is in a sharing mode, the first electrode, the second electrode, the third electrode, and the fourth electrode are not enabled, and long axes of a plurality of liquid crystal molecules of the liquid crystal layer are substantially perpendicular to the first base.

12. The display apparatus according to claim 1, wherein an angle θ is formed between one of the plurality of branch portions of the second electrode and one of the plurality of branch portions of the fourth electrode, and 80°≤θ≤100°.

13. The display apparatus according to claim 1, wherein a plurality of liquid crystal molecules of the liquid crystal layer are a plurality of negative liquid crystal molecules.

* * * * *